UNITED STATES PATENT OFFICE

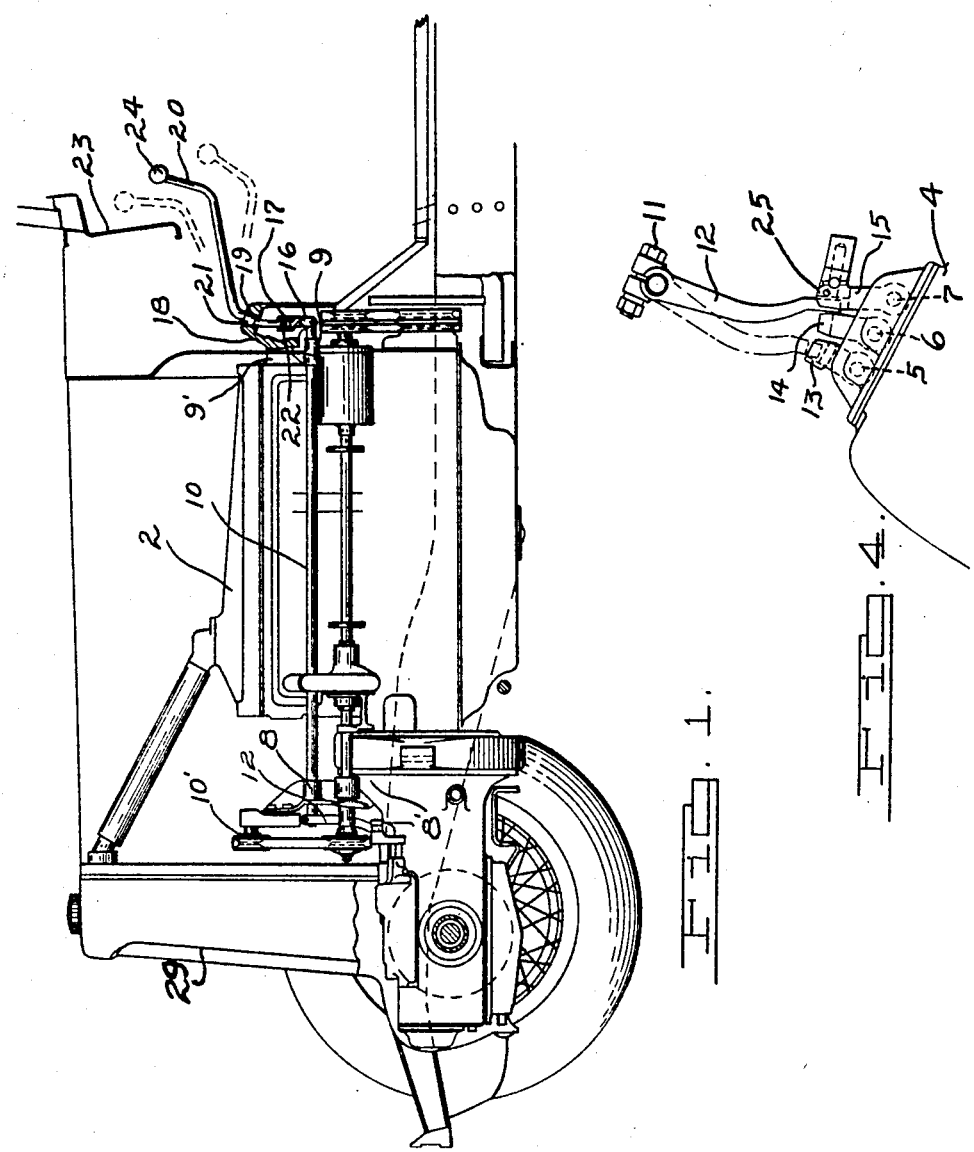

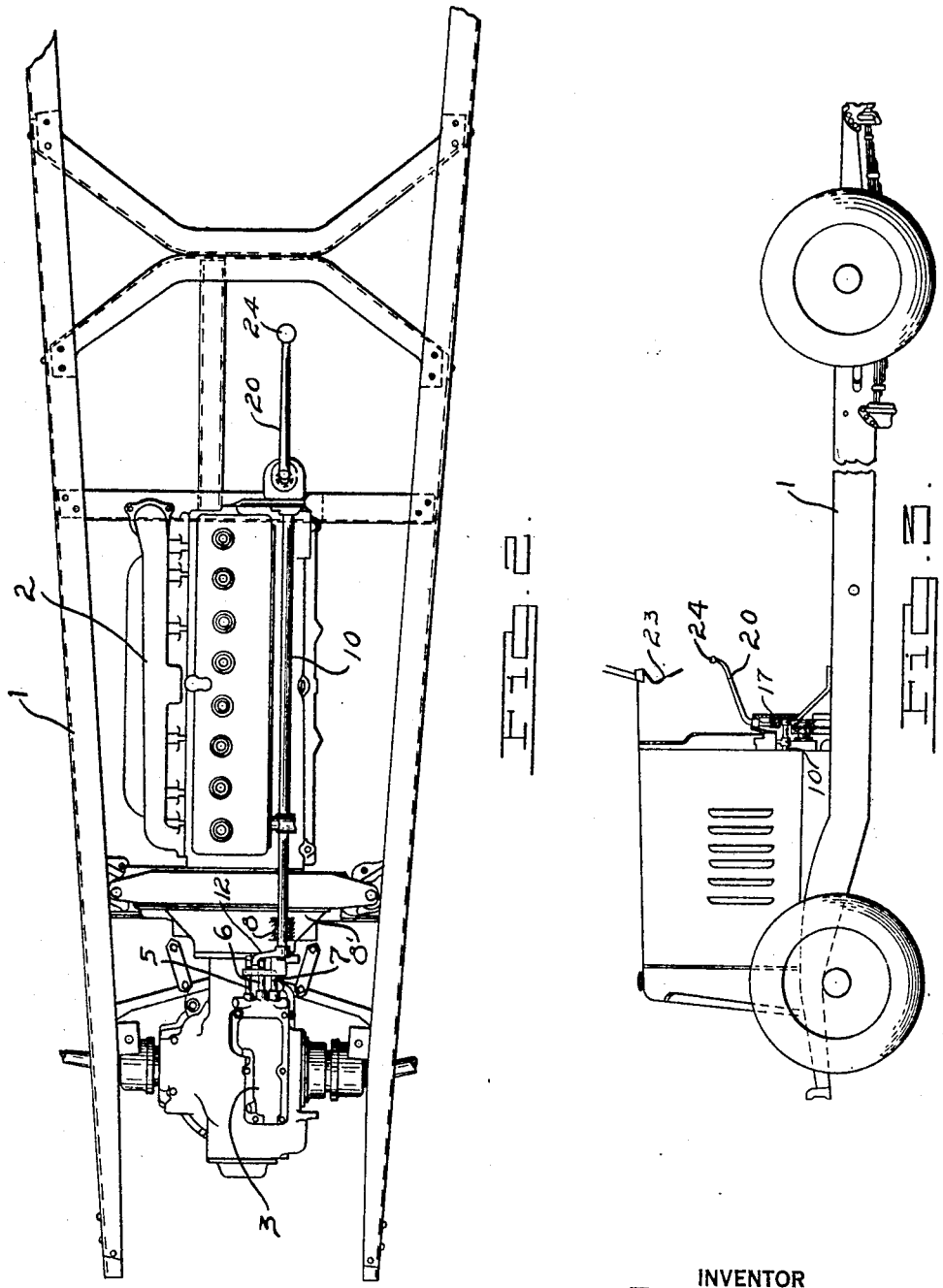

ROSCOE C. HOFFMAN, OF DETROIT, MICHIGAN

GEAR SHIFT

Application filed April 8, 1930. Serial No. 442,646.

This invention relates to gear shifting mechanism for front wheel drive motor vehicles.

The main objects of the invention are to provide improved transmission controlling mechanism; to provide mechanism of this kind, which is particularly adapted for shifting the gears of the transmission of front wheel driven motor vehicles; to provide a simple and economical construction permitting the gears in a transmission positioned at one end of the engine of a motor vehicle to be shifted by a lever positioned at the opposite end of the engine; and to provide such a construction whereby the gear shift lever has the same wobble action as the gear shift levers of standard rear wheel driven motor vehicles.

An illustrative embodiment of my invention is shown in the accompanying drawings, in which:

Fig. 1 is a fragmentary side elevation partly in section, a vehicle embodying my invention.

Fig. 2 is a fragmentary top plan view of a vehicle chassis embodying my invention.

Fig. 3 is a side elevation of a vehicle having my improved gear shifting apparatus.

Fig. 4 is a front end view of the vehicle transmission and the control mechanism thereof.

In the form shown, my invention is illustrated in connection with a passenger vehicle having a chassis frame 1, an engine 2 mounted on the intermediate portion of the frame and transmission mechanism 3 mounted on the front end of the engine. The transmission has longitudinally shiftable gear shifting rods 5, 6 and 7 extending rearwardly toward the engine 2. The gear shift rod 5 controls the gear (not shown) of the transmission, by which both low and second speed gear settings are obtained; the gear shift rod 6 controls the gear (not shown) which produces third and fourth speed settings of the transmission; and the gear shift rod 7 is provided for controlling a reverse gear (not shown).

An oscillatable shaft 10 extending longitudinally of the automobile in proximity to the side of the engine, is shiftably supported in brackets 8 and 9 which are mounted on the flywheel housing 8' and flange 9' of the cylinder block of the engine respectively. Shifter rods 5, 6 and 7 are shiftably mounted in accordance with conventional practice in the upper wall of the transmission mechanism 3, between the radiator 29 and the front end of the engine, and the front end of the shaft 10 terminates directly above the shifter rods. The rear end of the shaft 10 projects into and terminates adjacent the forward wall of the usual passenger compartment. It might be noted in passing that the bracket 8 not only serves as a support for the forward end of the shaft 10 but is extended upwardly therefrom so as to also serve as a support for the fan pulley 10' and fan (not shown). An arm 12 is rigidly clamped at its upper end by means of a bolt 11 to the forward end of the shaft 10 and its lower end extends down into proximity to the shifter rods 5, 6 and 7 which are provided with lugs 13, 14 and 15 respectively, for selective engagement therewith in accordance with conventional practice. A lever or arm 16 is rigidly mounted on the rear end of the shaft 10 and extends radially thereof in a direction substantially diametrically opposite to the lever 12. The outer end of the arm 16 has a socket 17 of the type used in universal joints.

Mounted on the bracket 9' on the cylinder block of the engine 2 is a support 18 having a socket 19 at its upper end which is located in the passenger compartment of the vehicle above the toe-riser thereof. A gear shift lever 20 having a ball 21 swiveled in the socket 19 is mounted on the support 18 and the lower end of the lever has a ball 22 which is swiveled in the socket 17 of the arm 16. The lever 20 extends rearwardly from the support 18 to a position in front of the instrument board 23 and its upper end portion is bent upwardly and provided with a ball 24.

Mounted on the housing of the transmission 3 is a yieldable detent 25 which engages the lever 12 immediately before the latter is rotated into registration with the forked end of the lug 15 of the reverse gear shift rod 7. This detent prevents the lever 12 from being rotated out of registration with the forked end of the lug 14 and into registration with the lug 15 by normal pressure on the gear shift lever 20, and necessitates an added amount of exertion on the part of the driver to place the reverse gear in operation.

The gear shift lever 20 has a wobble action substantially identical to the action of gear shift levers of conventional types which are commonly used for shifting gears of rear wheel driven vehicles.

In operation, when the lever 20 is tilted from the central or neutral position toward the right side of the vehicle as viewed in Fig. 2, the arm 16 is rotated in a counter-clockwise direction causing the lever 12 at the front end of the shaft 10 to be rotated in a clockwise direction substantially in synchronism with the shift lever 20 until the end of the lever 12 is in registration with the forked extremity of the lug 13 on the gear shift rod 5. Forward movement of the gear shift lever while it is in this position shifts the shaft 10 rearwardly withdrawing the rod 5 rearwardly and placing the transmission in a low speed setting. Rearward movement of the gear shift lever 20 when it is tilted to the right of the vehicle from its neutral position shifts the shaft 10 together with the rod 6 forwardly, placing the second speed gear of the transmission in an operative position.

By swinging the gear shift rod 20 to the left of the vehicle the arm 16 is rotated in a clockwise direction and the arm 12 is rotated in a counter-clockwise direction and its free end travels in the same phase of movement on the free end of the shift lever 20 until the lever 12 engages the yieldable detent 25 at which position it is in registration with the lug 14 of the gear shift rod 6. Forward movement of the gear shift lever while it is in this position shifts the shaft 10 rearwardly, extending the rod 6 relative to the transmission housing and placing the gears of the transmission in their third speed setting, and by moving the gear shift lever 20 rearwardly the shaft 10 and gear shift rod 6 are shifted forwardly, thus placing the gears in a fourth or high speed setting.

When the gear shift lever 20 is moved to the right against the action of the detent 25 by the driver's exertion of an additional force beyond that required to place the end of the lever 12 in the fork of the lug 14, the lever 12 is brought into registration with the forked end of the lug 15 on the shift rod 7, and when the latter rod is shifted forwardly by a forward thrust on the lever 20, the reverse gear of the transmission mechanism is meshed for reverse driving.

When the above transmission control apparatus is used in connection with transmissions having only three forward speeds, the gear shift action may be the same as the standard shifts of conventional transmissions.

With the above construction transmissions of substantially standard construction as used in rear wheel driving vehicles may be controlled by a wobble action of a gear shift lever in a conventional manner.

I claim:

1. In a vehicle, an engine at the forward end thereof, a radiator spaced forwardly from said engine, gear transmission substantially in longitudinal alignment with said engine disposed beneath said radiator and including gear shift bars having external ends located between said engine and radiator, a support in the passenger compartment of said vehicle having a socket therein, a gear shift lever having a ball portion swivelled in said socket and a crank member shiftably mounted on the side of said engine having an arm on its rear end flexibly connected with said lever and an arm on its front end registering with the external ends of said gear shift bars, the forward arm of said crank being selectively engageable with said bars and movable in synchronism with said gear shift lever.

2. In a vehicle including a chassis frame, front wheel driving mechanism mounted on the front end of said frame including a variable speed transmission having rearwardly extending longitudinally shiftable gear shift rods, an engine mounted on said frame and spaced rearwardly from said transmission, gear transmission in advance of said engine, a support above the toe-riser of said vehicle having a socket thereon, a gear shift lever having a ball swivelled in said socket, an arm on said ball, a shaft shiftably mounted on the side of said transmission having an inclined arm on its forward end extending between said engine and transmission coacting with said transmission for changing the gear ratio thereof, and an arm on the rear end of said shaft having a ball and socket connection with said arm of said shift lever.

ROSCOE C. HOFFMAN.